(12) United States Patent
Takada

(10) Patent No.: US 12,083,653 B2
(45) Date of Patent: Sep. 10, 2024

(54) GRIPPING TOOL

(71) Applicant: NAGAKI SEIKI CO., LTD., Osaka (JP)

(72) Inventor: Junsuke Takada, Osaka (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 393 days.

(21) Appl. No.: 17/596,653

(22) PCT Filed: Jun. 26, 2020

(86) PCT No.: PCT/JP2020/025195
§ 371 (c)(1),
(2) Date: Dec. 15, 2021

(87) PCT Pub. No.: WO2020/262604
PCT Pub. Date: Dec. 30, 2020

(65) Prior Publication Data
US 2022/0297274 A1 Sep. 22, 2022

(30) Foreign Application Priority Data
Jun. 27, 2019 (JP) .................................. 2019-119214

(51) Int. Cl.
*B25B 25/00* (2006.01)
(52) U.S. Cl.
CPC .................................. *B25B 25/00* (2013.01)
(58) Field of Classification Search
CPC ................................. B25B 25/00; H02G 1/04
See application file for complete search history.

(56) References Cited

U.S. PATENT DOCUMENTS

| | | | | |
|---|---|---|---|---|
| 1,942,625 A | * | 1/1934 | Whalan | F16G 3/006 |
| | | | | 24/132 R |
| 2,985,933 A | * | 5/1961 | Peterson | H01R 11/15 |
| | | | | 24/132 R |
| 9,768,596 B2 | * | 9/2017 | Nagaki | H02G 7/056 |
| 10,439,374 B2 | * | 10/2019 | Nagaki | H02G 1/00 |
| 10,574,038 B2 | * | 2/2020 | Iwama | H02G 1/04 |

(Continued)

FOREIGN PATENT DOCUMENTS

| | | |
|---|---|---|
| CN | 208546388 | 2/2019 |
| JP | 2004-242477 A | 8/2004 |

(Continued)

*Primary Examiner* — Seahee Hong
(74) *Attorney, Agent, or Firm* — Fay Kaplun & Marcin, LLP

(57) ABSTRACT

A wire gripper includes a link plate. The link plate has a moveable-side wire gripping portion so as to face a stationary-side wire gripping portion, and is movable toward a direction approaching or spaced away from the stationary-side wire gripping portion by rotation of the link plate. The wire gripper includes a cam plate and an eccentric shaft. The cam plate is rotated depending on operation thereby directly or indirectly pressing the link plate so as to regulate rotation of the link plate toward a direction where the moveable-side wire gripping portion is spaced away from the stationary-side wire gripping portion. The eccentric shaft can directly or indirectly further press the link plate along with rotation, in a state in which a pressing member directly or indirectly press the link plate.

8 Claims, 11 Drawing Sheets

(56) References Cited

U.S. PATENT DOCUMENTS

| | | | | |
|---|---|---|---|---|
| D1,002,310 S | * | 10/2023 | Alberti | D8/57 |
| 2012/0000037 A1 | * | 1/2012 | Chen | B25G 1/10 |
| | | | | 16/421 |
| 2012/0005863 A1 | * | 1/2012 | Chen | A62B 1/14 |
| | | | | 24/132 R |
| 2015/0232314 A1 | * | 8/2015 | Nagaki | H02G 1/04 |
| | | | | 294/135 |

FOREIGN PATENT DOCUMENTS

| | | |
|---|---|---|
| JP | 3180307 U | 12/2012 |
| WO | 2014/050171 A1 | 4/2014 |

* cited by examiner

GRIPPING TOOL

PRIORITY DATA

The present application is a 371 application of PCT Patent Application Serial No. PCT/JP2020/025195 filed on Jun. 26, 2020 which claims priority to Japanese Patent Application Serial No. 2019-119214 filed on Jun. 27, 2019. The disclosure of the above applications is incorporated herein by reference.

TECHNICAL FIELD

The present invention relates to a gripping tool.

BACKGROUND ART

A gripping tool that is attached to a linear body by holding the linear body being gripped has been conventionally known. PTL 1 discloses a wire gripper serving as this kind of gripping tool.

The wire gripper disclosed in PTL 1 includes a wire gripper body with which a stationary-side wire gripping portion is integrally formed, an action portion, and a moveable-side wire gripping portion. The action portion is attached to the wire gripper body such that the action portion is rotatable at one end of the wire gripper body. Rotation of the action portion toward one direction allows the moveable-side wire gripping portion to grip a linear body between the moveable-side wire gripping portion and the stationary-side wire gripping portion. The wire gripper further includes an action regulating portion that regulates rotation of the action portion toward the other direction, in order to prevent releasing of gripping of the linear body. The action regulating portion is provided, at a time of execution of regulation, on a surface side to which the stationary-side wire gripping portion and the moveable-side wire gripping portion are attached such that advance-retreat movement can be operated, and allows a distal end of the action regulating portion to come in contact with an action portion by operation of advance movement.

CITATION LIST

Patent Literature

PTL 1: Japanese Patent Application Laid-Open No. 2004-242477

SUMMARY OF THE INVENTION

Problems to be Solved by the Invention

In the above-described configuration of PTL 1, the action regulating portion has a screw shaft provided such that its advance-retreat movement can be operated in a rotation face of the action portion. A distal end of the screw shaft comes in contact with the action portion by operation of advance movement of the screw shaft and regulates rotation of the action portion toward the other direction. Therefore, when rotation of the action portion is regulated by using the action regulating portion, rotation of the screw shaft needs to be operated. For this reason, when the wire gripper is attached to the linear body, rotation operation of the screw shaft is time-consuming and there is a room for improvement.

The present invention relates to a gripping tool capable of regulating rotation of a link member with a simple operation.

In an aspect of the present invention, a gripping tool having the following configuration is provided. That is, the gripping tool includes a main body, a link member, a stationary-side gripping portion, and a moveable-side gripping portion. The link member is rotatably supported by the main body. The stationary-side gripping portion is provided in the main body. The moveable-side gripping portion faces the stationary-side gripping portion and is provided in the link member. The moveable-side gripping portion is movable toward a direction approaching or spaced away from the stationary-side gripping portion along with rotation of the link member. In the gripping tool, the stationary-side gripping portion and the moveable-side gripping portion grip and hold a linear body. The gripping tool includes a first pressing member and a second pressing member. The first pressing member can directly or indirectly press the link member, by rotation or sliding of the first pressing member depending on operation, to regulate rotation of the link member toward a direction where the moveable-side gripping portion is spaced away from the stationary-side gripping portion. The second pressing member can directly or indirectly further press the link member depending on operation, in a state in which the first pressing member directly or indirectly presses the link member. A stoke in which a member directly coming in contact with and pressing the link member additionally advances by movement of the second pressing member is smaller than a stroke in which the member directly coming in contact with and pressing the link member advances by rotation or sliding of the first pressing member.

Accordingly, when a wire gripper is attached to the linear body, rotation of the link member can be regulated with a simple operation of a regulating portion, without detachment of the wire gripper from the linear body. In addition, the first pressing member quickly presses the link member; subsequently, the second pressing member presses the link member with a short stroke (strongly), the above-described regulation can be realized smoothly in a short time.

The gripping tool is preferably configured as follows. That is, the gripping tool includes an operating portion to be rotatably operated. The second pressing member is an eccentric cam. The first pressing member is a pressing cam that is rotatably supported by the eccentric cam. The pressing cam and the operating portion are integrally rotated with each other along with rotation operation of the operation portion and directly or indirectly press the link member. When the operation portion is further operated to rotate, the pressing cam that is moved by the eccentric cam being rotated directly or indirectly further presses the link member.

Accordingly, rotation regulation in which rotation of the link plate is regulated by two pressing members can be achieved with one action that allows the operation portion to be rotated.

The gripping tool is preferably configured as follows. That is, the gripping tool includes a holding portion that holds the operating portion without rotation relative to the pressing cam. The holding portion releases holding of the operating portion when pressing reaction force generated along with pressing in which the pressing cam directly or indirectly presses the link member exceeds a predetermined strength.

Accordingly, it is possible automatically switch pressing between pressing along with rotation of the first pressing member (pressing cam) and additional pressing along with the second pressing member, with a simple configuration.

The gripping tool is preferably configured as follows. That is, the first pressing member indirectly presses the link member with an intermediate member. An engagement mechanism mechanically coupling the intermediate member and the first pressing member by utilizing pressing force of the first pressing member, is provided between the intermediate member and the first pressing member.

Accordingly, a configuration easily applied to an existing wire gripper can be achieved. It is possible to automatically lock the first pressing member without moving toward the direction releasing the regulation along with pressing.

The gripping tool can be also configured as follows. That is, first pressing member directly presses the link member. An engagement mechanism mechanically coupling the link member and the first pressing member by utilizing pressing force of the first pressing member, is provided between the link member and the first pressing member.

Accordingly, a simple configuration with a small number of components can be achieved. It is possible to automatically lock the first pressing member without moving toward the direction releasing the regulation along with pressing.

The gripping tool is preferably configured as follows. That is, the first pressing member is disposed onto a base member capable of linearly moving relative to the main body. The gripping tool includes a one-way clutch. The one-way clutch allows movement of the base member toward a direction where the first pressing member approaches the link member, and prevents movement of the base member toward an opposite direction.

Accordingly, linear movement of the base member can quickly press the link plate with the first pressing member.

DETAILED DESCRIPTION

Figure 1:
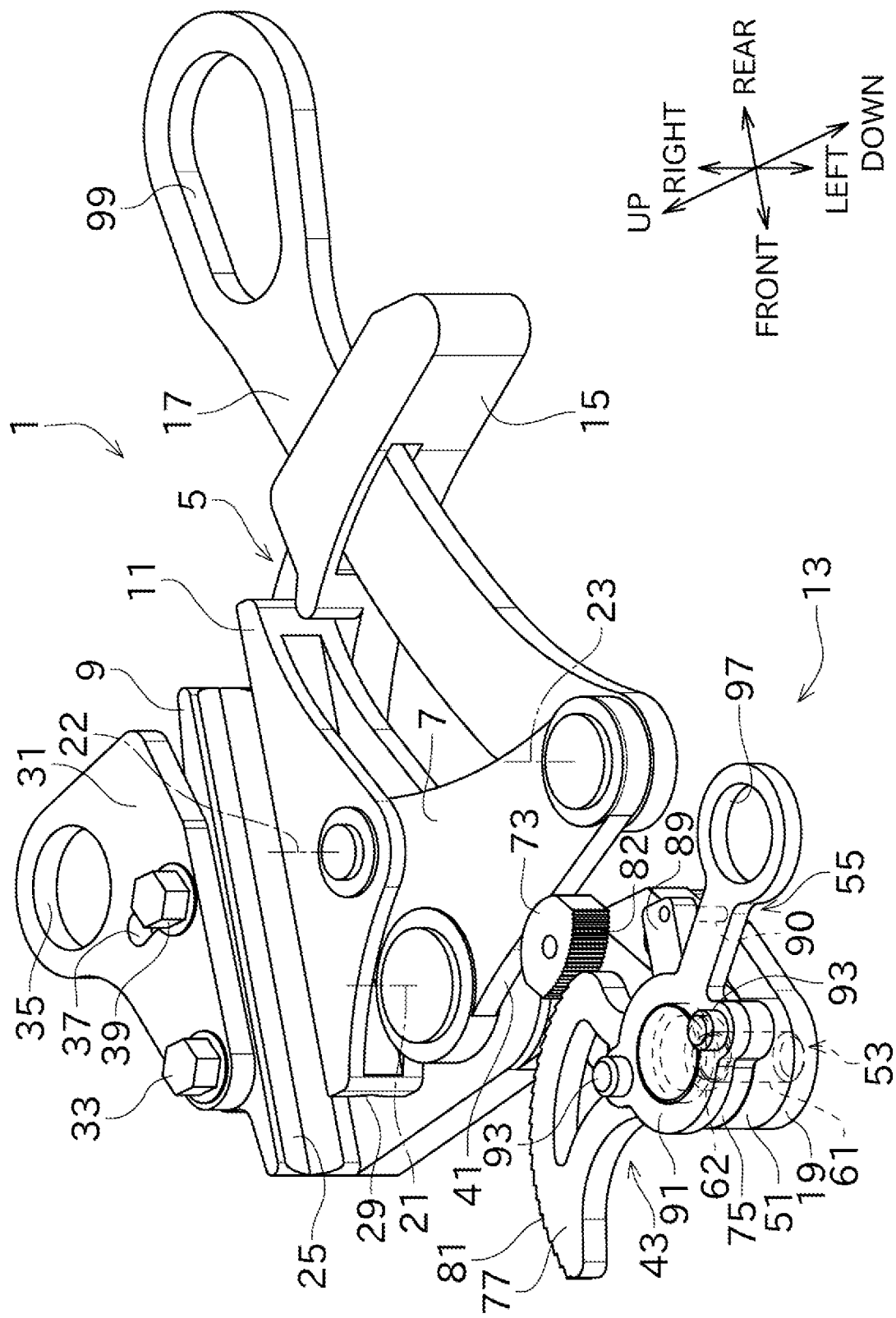
FIG. 1 is a perspective view of a wire gripper according to s first embodiment of the present invention.
Figure 2:
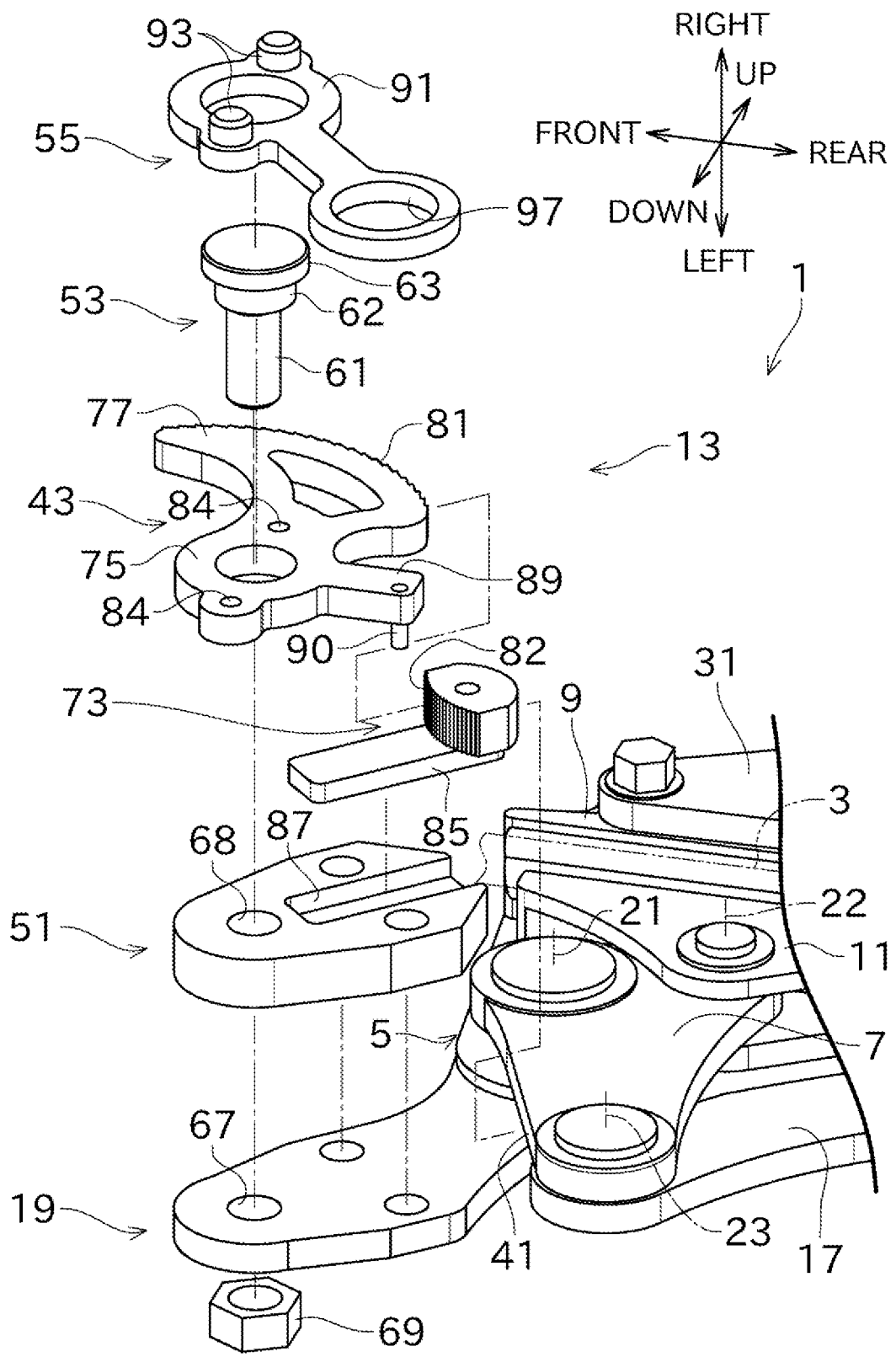
FIG. 2 is an exploded perspective view of a regulating portion of the wire gripper.
Figure 3:
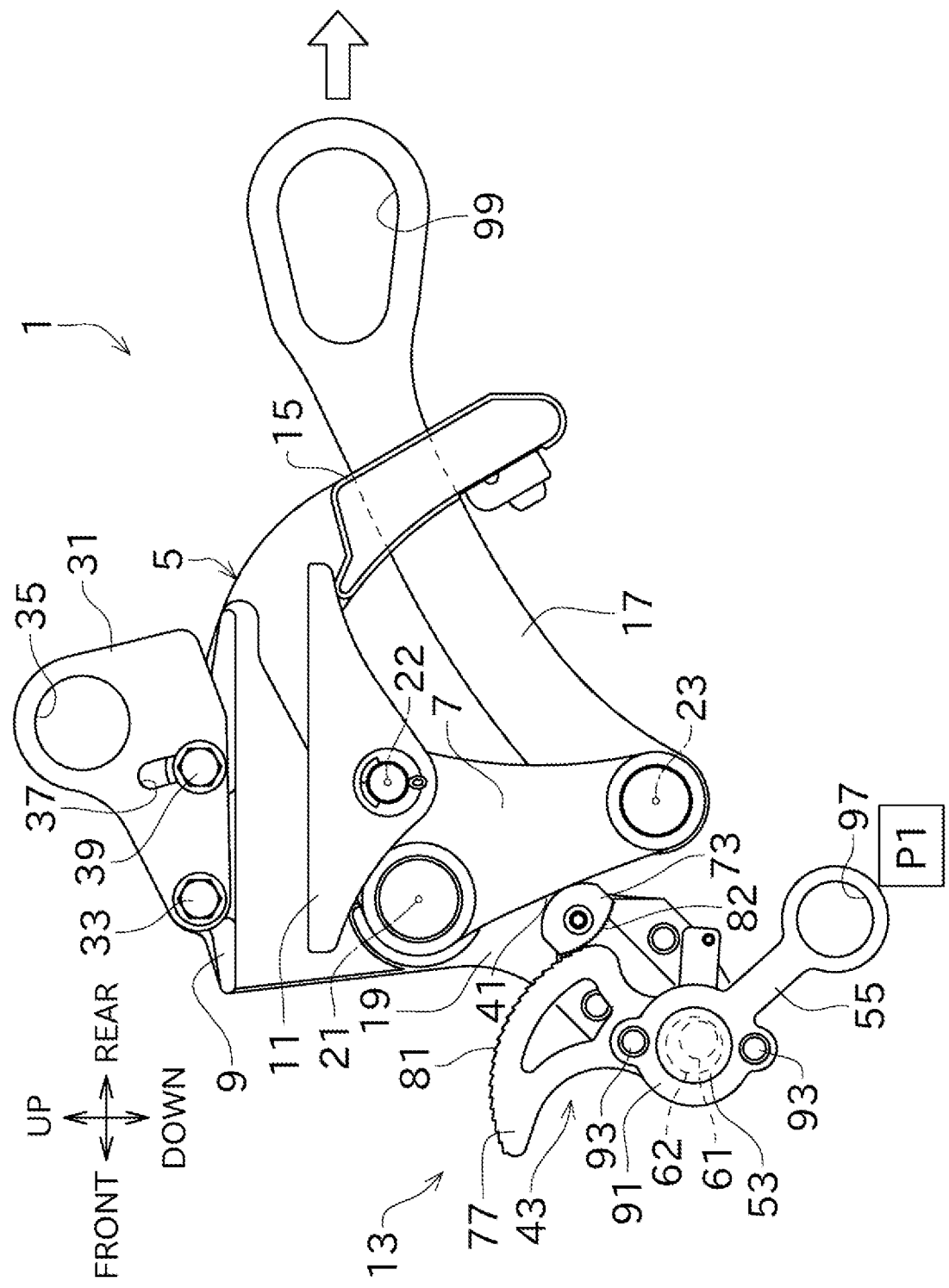
FIG. 3 is a drawing of the wire gripper as viewed in a horizontal direction perpendicular to a linear body.

Next, embodiments of the present invention will be described with reference to drawings. A first embodiment of the present invention will be described with reference to FIG. 1 to FIG. 3. FIG. 1 is a perspective view of a wire gripper 1 according to the first embodiment of the present invention. FIG. 2 is an exploded perspective view of a regulating portion 13 in the wire gripper 1. FIG. 3 is a drawing of the wire gripper 1 as viewed in a horizontal direction perpendicular to a linear body 3.

The wire gripper (gripping tool) 1 illustrated in FIG. 1 is a tool capable of gripping the linear body 3 (such as an electric wire or a wire). The wire gripper 1 is applied to a device (a wire tensioning device) that pulls the linear body 3 when works for the linear body 3 are performed. When such device is used, the wire gripper 1 grips the linear body 3 and is attached to the linear body 3.

For example, in a work for the electric wire, the electric wire corresponding to the linear body 3 is horizontally tensioned, and the wire gripper 1 is used to sandwich the linear body 3 in an up-down direction. Hereinafter, a longitudinal direction of the linear body 3 may be referred to as a front-rear direction, and a direction perpendicular to both the front-rear direction and the up-down direction may be referred to as a right-left direction. However, these terms are used for convenience and does not limit a positional relationship of components. The front-rear direction, the up-down direction, and the right-left direction are indicated by arrows from FIG. 1 to FIG. 3.

The wire gripper 1 includes a main body 5, a link plate (link member) 7, a stationary-side wire gripping portion (stationary-side gripping portion) 9, a moveable-side wire gripping portion (moveable-side gripping portion) 11, and a regulating portion 13.

The main body 5 is a base member to which various kinds of components for forming the wire gripper 1 are attached. The stationary-side wire gripping portion 9 is integrally formed with the main body 5.

The stationary-side wire gripping portion 9 is elongated along the front-rear direction. As illustrated in FIG. 1 and the like, the stationary-side wire gripping portion 9 has, on its lower surface, a first groove 25 that is elongated along the front-rear direction and accommodates an upper part of the linear body 3. The first groove 25 is opened at its lower side.

The main body 5 has a link plate 7 that is rotatably supported around a first axial line 21. The link plate 7 has a triangular plate shape. The moveable-side wire gripping portion 11 is rotatably supported around a second axial line 22 and is located at the link plate 7, specifically at its position spaced slightly away from the first axial line 21 toward one side of the link plate 7 along the front-rear direction.

The moveable-side wire gripping portion 11 has a triangular shape that is elongated along the front-rear direction. As illustrated in FIG. 1, the moveable-side wire gripping portion 11 has, on its upper surface, a second groove 29 that is elongated along the front-rear direction and that can store a lower part of the linear body 3. The second groove 29 is opened at its upper end.

The moveable-side wire gripping portion 11 is disposed below the stationary-side wire gripping portion 9. The moveable-side wire gripping portion 11 is disposed such that an opened portion of the second groove 29 faces an opened portion of the first groove 25 of the stationary-side wire gripping portion 9 in the up-down direction.

A connection member 17 having an elongated shape is connected to the link plate 7, specifically its position spaced away downward from the first axial line 21. One end of the connection member 17 along its longitudinal direction is supported by a lower end of the link plate 7 and is rotatable around a third axial line 23. The longitudinal direction of the connection member 17 is substantially oriented toward the front-rear direction.

The main body 5 has a guide portion 15 that guides the connection member 17. The main body 5 and the guide portion 15 are integrally formed with each other. As illustrated in FIG. 3, the guide portion 15 extends diagonally downward from one end of the stationary-side wire gripping portion 9 far from the first axial line 21 toward a direction spaced away from the first axial line 21 in the front-rear direction. As illustrated in FIG. 1, the guide portion 15 has an insertion hole. The connection member 17 which has been inserted into such insertion hole can be moved substantially along the front-rear direction by a guide of the insertion hole.

With the above-described configuration, the connection member 17 is moved toward the longitudinal direction, which allows the link plate 7 to be rotated around the first axial line 21. Along with such rotation, the moveable-side wire gripping portion 11 connected to be connected to the link plate 7 is moved along the up-down direction so as to approach or be spaced from the stationary-side wire gripping portion 9. The moveable-side wire gripping portion 11 is moved so as to approach the stationary-side wire gripping portion 9, which can grip and hold the linear body 3 with the stationary-side wire gripping portion 9 and the moveable-side wire gripping portion 11.

Hereinafter, among rotation directions of the link plate 7, a direction where the moveable-side wire gripping portion 11 approaches the stationary-side wire gripping portion 9 may be referred to as a "gripping direction", and the opposite direction may be referred to as a "releasing direction". In FIG. 3, the gripping direction corresponds to a counterclockwise direction and the releasing direction corresponds to a clockwise direction.

Considering a space sandwiched by the stationary-side wire gripping portion 9 and the moveable-side wire gripping portion 11 therebetween in the up-down direction, one side of such space in the right-left direction is blocked by the main body 5. The other side of such space in the right-left direction corresponds to an opened portion for putting in and out the linear body 3.

A cover 31 having a plate-like shape is attached to the main body 5 so as to close the opened portion. The cover 31 is supported by the stationary-side wire gripping portion 9 and is rotatable around a rotation shaft 33. In the present embodiment, the rotation shaft 33 serves as a shaft of a bolt, but other components are acceptable.

The cover 31 has a first operation hole 35 and a guide hole 37 which are through holes. A tool or the like is inserted into the first operation hole 35. The guide hole 37 is an arc-shaped long hole. A guide member 39 fixed to the main body 5 is inserted into the guide hole 37. In the present embodiment, the guide member 39 serves as a shaft of a bolt, but other components are acceptable. The guide hole 37 and the guide member 39 determine a range of a rotatable angle of the cover 31.

Figure 4:
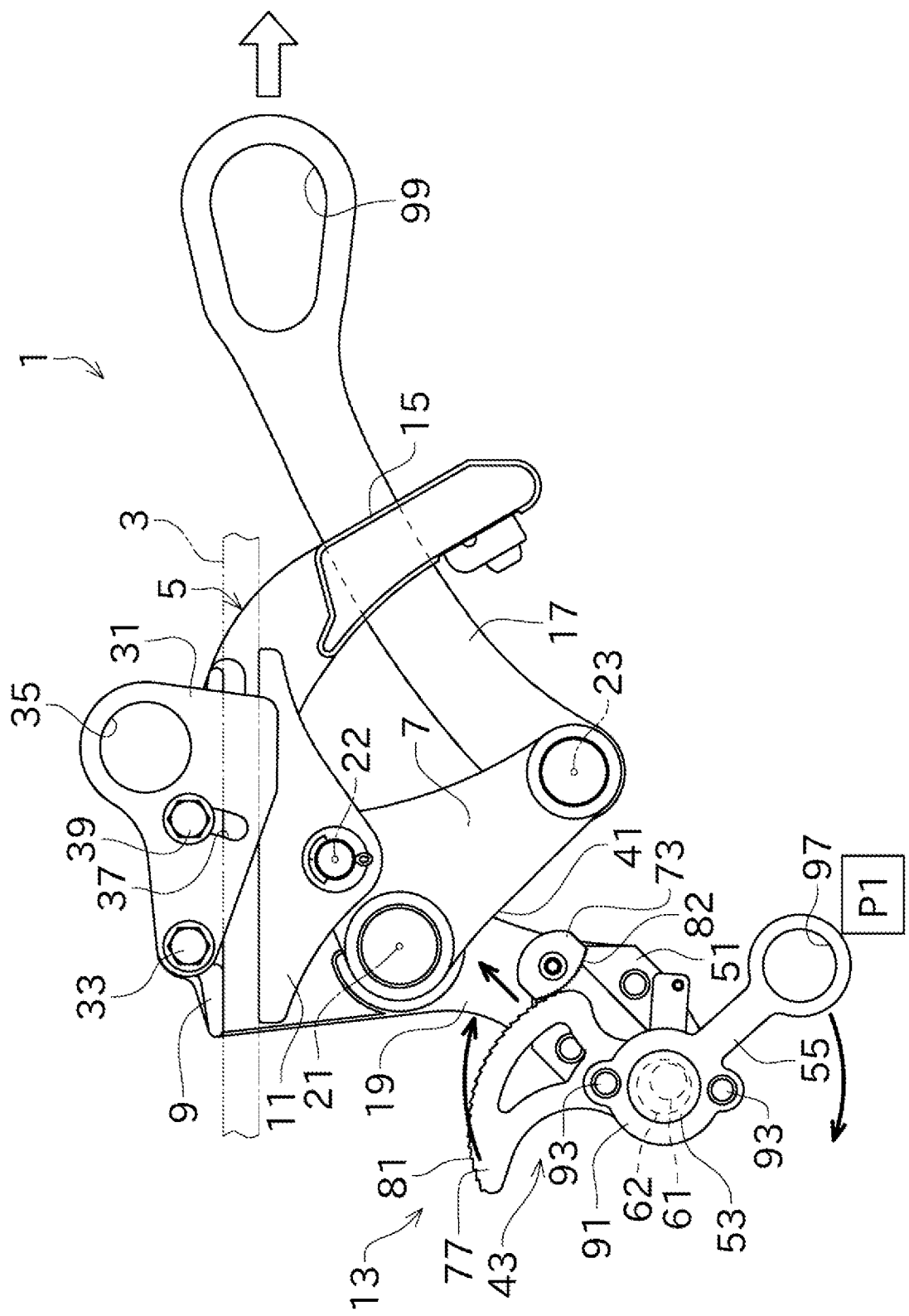
FIG. 4 is a drawing illustrating a state in which a connection member is pulled from a state illustrated in FIG. 3 and the linear body is gripped.

In a state of FIG. 1 and FIG. 3 with the above-described configuration, for example, the tool or the like is inserted into the first operation hole 35, and the cover 31 is pressed downward. Accordingly, the cover 31 can be rotated downward as illustrated in FIG. 4. Therefore, when the linear body 3 is fitted between the stationary-side wire gripping portion 9 and the moveable-side wire gripping portion 11, the linear body 3 can be covered with the cover 31.

The main body 5 has a supporting plate (supporting member) 19. As illustrated in FIG. 2, the supporting plate 19 is fixed to the main body 5, specifically its position near the first axial line 21, by welding, for example. The supporting plate 19 extends diagonally downward, and extends from the above-described position connecting the supporting plate 19 and the main body 5 toward a direction spaced away from the link plate 7.

The regulating portion 13 is disposed onto the supporting plate 19. The regulating portion 13 regulates movement of the moveable-side wire gripping portion 11 with the linear body 3 clamped by the stationary-side wire gripping portion 9 and the moveable-side wire gripping portion 11, which prevents looseness of such clamping for the linear body 3. As illustrated in FIG. 1 and the like, the regulating portion 13 is disposed on an opposite side of the connection member 17 in the front-rear direction across the link plate 7.

As illustrated in FIG. 2, the regulating portion 13 includes a guide groove member 51, an eccentric shaft (second pressing member) 53, a cam plate (first pressing member) 4, a stopper member (intermediate member) 73, and an operation lever 55.

The guide groove member 51 is fixed onto the supporting plate 19 by using a fastening member (such as a bolt, not illustrated). The guide groove member 51 has a slide groove 87 having a linear shape for guiding a sliding direction of the stopper member 73 which will be described later.

The eccentric shaft 53 is rotatably supported by and attached onto the supporting plate 19. The eccentric shaft 53 has a first shaft part 61 having a small diameter and a second shaft part 62 having a large diameter. One end of the first shaft part 61 and one end of the second shaft part 62 in their axial direction are coupled to and integrally formed with each other. The first shaft part 61 and the second shaft part 62 are parallel to each other, but there is misalignment between their center of axis.

As illustrated in FIG. 2, the supporting plate 19 and the guide groove member 51 have supporting holes 67, 68 respectively, which are through holes. The first shaft part 61 is rotatably inserted into the supporting holes 67, 68. In the present embodiment, the first shaft part 61 serves as a screw shaft. Therefore, as illustrated in FIG. 2, the first shaft part 61 is screwed into a nut 69, which allows the eccentric shaft 53 to be attached to the supporting plate 19 and the guide groove member 51. With the eccentric shaft 53 attached in this manner, the second shaft part 62 is positioned adjacent to the guide groove member 51. Both an axis of the first shaft part 61 and an axis of the second shaft part 62 are parallel to the first axial line 21 which is the center of rotation of the link plate 7.

A cam plate 43 includes a base 75 and a cam portion 77. The base 75 and the cam portion 77 are integrally formed with each other.

The base 75 has a shaft hole as a through hole. The second shaft part 62 of the eccentric shaft 53 is inserted into the shaft hole, thereby allowing the base 75 to be rotatably supported. Accordingly, the cam plate 43 can be rotated around the second shaft part 62.

The cam portion 77 is formed as a plate-like cam. The cam portion 77 serving as an eccentric cam has a substantially arc shape in which an outer peripheral portion of the cam portion 77 is spaced away from the center of rotation as increasing its angle (a counterclockwise rotation in FIG. 3 is positive). A stopper member 73 which will be described later faces the outer peripheral portion of the cam portion 77. With the above-described configuration, along with a clockwise rotation of the cam plate 43, the outer peripheral portion of the cam portion 77 comes in contact with the stopper member 73, which can press the stopper member 73 toward a direction spaced away from the center of rotation.

As illustrated in FIG. 2, the cam portion 77 has, on its outer peripheral surface, a first claw 81 formed by continuous roughness. The first claw 81 is engageable with a second claw 82 formed in the stopper member 73.

The stopper member 73 is a member that directly comes in contact with an edge (contactless portion) 41 of the link plate 7 in order to regulate movement of the moveable-side wire gripping portion 11. The stopper member 73 is sandwiched between the outer peripheral portion of the cam portion 77 and the link plate 7. As illustrated in FIG. 2, the stopper member 73 is fixed to one end of a slide base 85 in its longitudinal direction. The slide base 85 is an elongated plate-like member. The slide base 85 is fitted into the above-described slide groove 87 formed in the guide groove member 51 and is movable along the longitudinal direction of the slide groove 87. The slide base 85 slides along the slide groove 87; accordingly, the stopper member 73 can advance toward and retreat from the edge 41 of the link plate 7.

The stopper member 73 has the second claw 82 formed by continuous roughness. The second claw 82 and the first claw 81 of the cam plate 43 form an engagement mechanism capable of mechanically engaging with each other.

A protrusion 89 is integrally formed with the base 75 of the cam plate 43. A regulatory pin 90 serving as a rotation regulation member is fixed to the protrusion 89. The regulatory pin 90 comes in contact with an appropriate part of the guide groove member 51, which regulates one side of a rotational stroke of the cam plate 43.

The operation lever 55 is an elongated plate-like member. A boss portion 91 is formed on one end of the operation lever 55 in its longitudinal direction. The boss portion 91 has a shaft hole as a through hole. As illustrated in FIG. 2, a flange part 63 formed in the second shaft part 62 of the eccentric shaft 53 is unrotatably fixed to the shaft hole. In the present embodiment, press-fitting is used as a method for fixing the flange part 63, but other appropriate methods such as a key coupling are acceptable.

A second operation hole 97 into which the tool or the like can be inserted is formed on the other end of the operation lever 55 in its longitudinal direction. A user of the wire gripper 1 uses the tool or the like inserted into the second operation hole 97 to operate the operation lever 55 so as to be rotated around the eccentric shaft 53.

The boss portion 91 of the operation lever 55 faces the base 75 of the cam plate 43 in the axial direction. The boss portion 91 of the operation lever 55 has a pair (two) of ball plungers (holding portions) 93. As illustrated in FIG. 2, the base 75 of the cam plate 43 has recesses 84 at respective positions corresponding to the ball plungers 93. A steel ball (not illustrated) that is pressed by spring force of each of the ball plungers 93 can be fitted into the corresponding recess 84.

With the above-described configuration, a case in which the operation lever 55 is rotated clockwise from a state in FIG. 4 around the eccentric shaft 53 will be described. Hereinafter, with respect to rotation directions of the operation lever 55 and the cam plate 43, a clockwise direction of FIG. 4 may be referred to as a "regulation direction", and a counterclockwise direction may be referred to as a "deregulation direction".

At the beginning of rotational stroke of the operation lever 55 to be rotated toward the regulation direction, the operation lever 55 is held by the ball plungers 93 without rotation relative to the cam plate 43. Therefore, the cam plate 43 is coupled to and integrally rotated with the operation lever 55. The stopper member 73 is pressed by the cam portion 77 of the cam plate 43 being rotated, and slides toward a direction approaching the link plate 7. Finally, the stopper member 73 comes in contact with and presses the edge 41 of the link plate 7.

The first claw 81 formed on the outer peripheral surface of the cam portion 77 has a shape like a signal waveform of a sawtooth wave. Thus, when the cam plate 43 starts to rotate in the regulation direction with the stopper member 73 coming in contact with the cam portion 77, the first claw 81 is not caught much in the second claw 82. On the other hand, when the cam plate 43 starts to rotate in the deregulation direction with the stopper member 73 coming in contact with the cam portion 77, the first claw 81 is strongly caught in the second claw 82. Such a feature of one-way clutch of the claws prevents the cam plate 43 from unexpectedly rotating in the deregulation direction.

As described above, the operation lever 55 is fixed to the eccentric shaft 53. Thus, since the operation lever 55 and the eccentric shaft 53 are integrally rotated with each other (around the first shaft part 61), a position of the second shaft part 62 that is a support shaft of the operation lever 55 changes to draw a small arc. Therefore, in a process of rotating the cam plate 43 from a state of FIG. 4 to a state of FIG. 5, at the same time, the center of rotation of the cam plate 43 moves so as to draw a small arc-shaped locus with a radius corresponding to the amount of eccentricity of the eccentric shaft 53.

Figure 5:
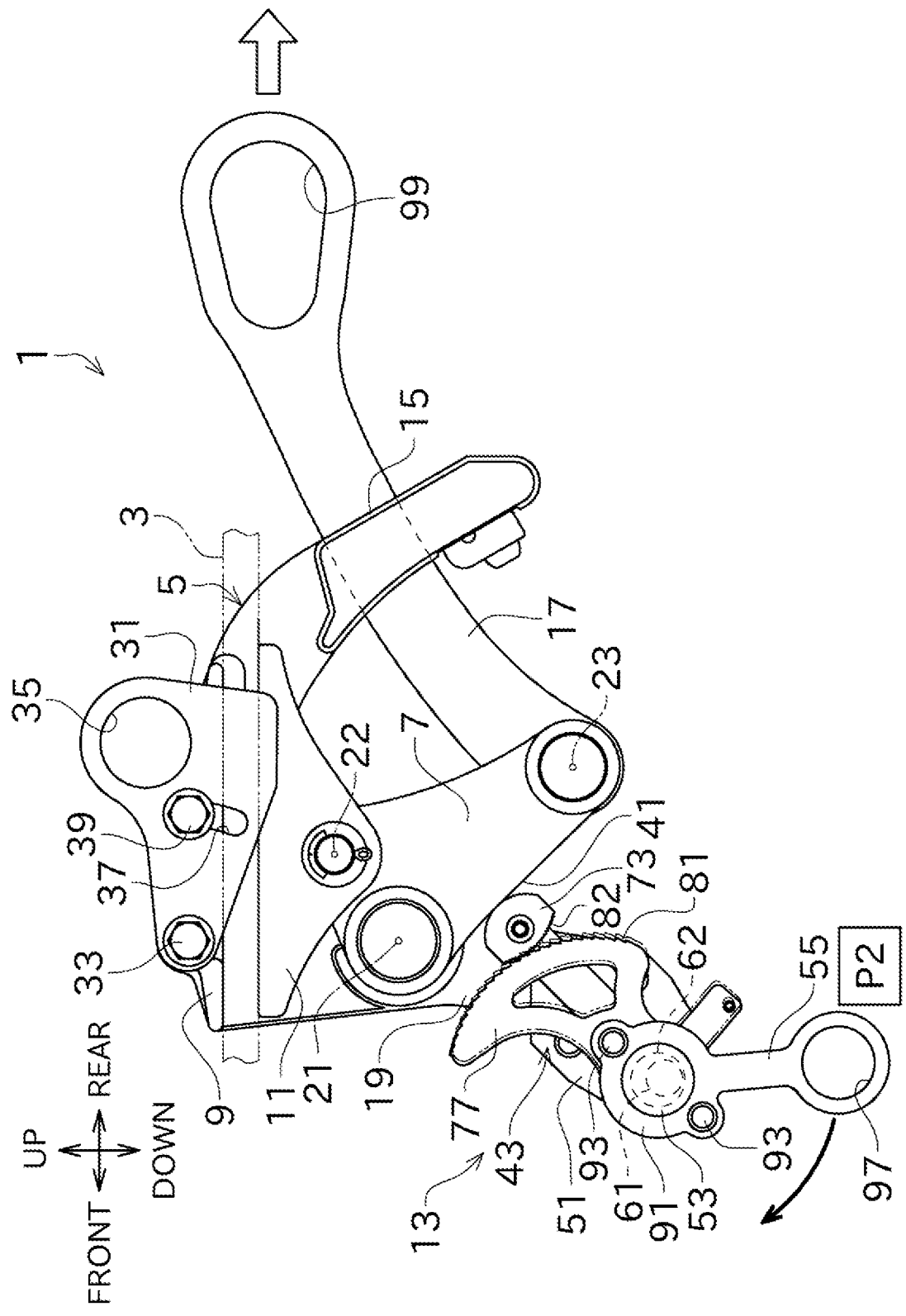
FIG. 5 is a drawing illustrating a state in which an operation lever rotates from a state illustrated in FIG. 4 and a cam plate presses a link plate with a stopper member.

FIG. 5 illustrates a state in which the cam plate 43 presses the link plate 7 with the stopper member 73. A pressing reaction force, as a reaction in which the cam plate 43 presses the link plate 7, acts on the cam plate 43. Such pressing reaction force increases along with an increase in a pressing force of the cam portion 77 (in other words, along with rotation of the cam plate 43 in the regulation direction). When the pressing reaction force exceeds a predetermined strength, steel balls of the ball plungers 93 come out of the recesses 84 of the cam plate 43. Thus, coupling of the operation lever 55 relative to the cam plate 43 is released. Although a position where coupling of the operation lever 55 is released is changeable, in the description herein, it is assumed that holding by the ball plungers 93 is released when the operation lever 55 reaches a second operation position P2 illustrated in FIG. 5. After that, the cam plate 43 no longer rotates in the regulation direction, and only the operation lever 55 rotates independently in the regulation direction.

Even after the operation lever 55 exceeds the second operation position P2 and is no longer held relative to the cam plate 43, a position of the second shaft part 62 of the eccentric shaft 53 continues to change along with rotation of the operation lever 55. Since the cam portion 77 is stretched between the base 75 and the stopper member 73, changing of the center of axis of the second shaft part 62 causes the cam portion 77 to further press the link plate 7 with the stopper member 73. FIG. 5 illustrates, by a chain line, a position of the cam plate 43 after its slight movement along with this pressing. At this time, the second shaft part 62 substantially functions as a cam (eccentric cam). Since the amount of eccentricity is sufficiently small relative to the length of the operation lever 55, pressing force at this time is extremely strong due to the principle of leverage.

Such strong pressing force and pressing reaction force allows the first claw 81 and the second claw 82 to have mechanical strong engagement therebetween. Accordingly, for example, even when some vibration is applied to the stopper member 73, engagement of the claws therebetween is not released. This can substantially lock the cam plate 43 without its rotation in the deregulation direction.

As such, the regulating portion 13 is configured to execute a first operation and a second operation for rotation of the link plate 7 around the first axial line 21. The first operation is to push out the stopper member 73 by cam action caused by rotation of the cam plate 43, and to press the stopper member 73 relative to the edge 41 of the link plate 7 with a certain strength. The second operation is to strongly press the edge 41 with the cam plate 43 and the stopper member 73 by cam action of the eccentric shaft 53 in a state in which the first operation is executed.

The following will describe the stopper member 73 as a member that directly comes in contact with and presses the link plate 7. A stroke (a stroke from a state of FIG. 5 to a state of FIG. 6) in which the stopper member 73 additionally advances along with the second operation (rotation of the eccentric shaft 53) is smaller than a stoke (a stroke from a state of FIG. 4 to a state of FIG. 5) in which the stopper member 73 advances along with the first operation (rotation of the cam plate 43). More specifically, the first operation and the second operation have different strokes in which the stopper member 73 advances per unit operation angle of the operation lever 55.

Next, works in which the wire gripper 1 having the above-described configuration is attached to and detached from the linear body 3 will be described.

Firstly, the operation lever 55 of the regulating portion 13 is rotated as necessary and positioned near a first operation position P1 as illustrated in FIG. 3. In this state, the regulating portion 13 does not function, and rotation of the link plate 7 in the releasing direction is allowed. Thus, the moveable-side wire gripping portion 11 is sufficiently spaced away from the stationary-side wire gripping portion 9.

Subsequently, the wire gripper 1 is positioned in a specified part of the linear body 3, then, the linear body 3 passes between the stationary-side wire gripping portion 9 and the moveable-side wire gripping portion 11. In other words, an upper part of the linear body 3 is accommodated in the first groove 25 of the stationary-side wire gripping portion 9, thereby causing the wire gripper 1 to be suspended from the specified part of the linear body 3.

In this state, the tool or the like is inserted into the first operation hole 35 of the cover 31, thereby causing the cover 31 to be rotated downward around the rotation shaft 33. When the cover 31 is rotated, the cover 31 covers an opened portion between the stationary-side wire gripping portion 9 and the moveable-side wire gripping portion 11. This can prevent the wire gripper 1 from falling out of the linear body 3.

Subsequently, pulling force is applied to the connection member 17 in a direction indicated by an outlined white arrow in FIG. 3. For example, when the wire gripper 1 is adapted to the wire tensioning device, a connecting hole 99 formed in the connection member 17 is connected to the wire tensioning device. When the wire tensioning device is operated, force in the direction indicated by the outlined white arrow is to be applied to the connecting hole 99 of the connection member 17.

When the connection member 17 is pulled as described above, the link plate 7 connected to the connection member 17 is rotated in the gripping direction. As illustrated in FIG. 4, such rotation of the link plate 7 allows the linear body 3 to be sandwiched by the stationary-side wire gripping portion 9 and the moveable-side wire gripping portion 11.

As long as the pulling force of the connection member 17 is kept, the wire gripper 1 continues to grip and hold the linear body 3 with the stationary-side wire gripping portion 9 and the moveable-side wire gripping portion 11. As a result, mechanical fixation in which the wire gripper 1 is fixed to the linear body 3 is realized.

As described above, as long as the connection member 17 continues to be pulled toward the direction indicated by the outlined white arrow in FIG. 3, the wire gripper 1 continues to be tightly attached to the linear body 3. However, for some reasons, when the above-described pulling force cannot be sufficiently obtained, the link plate 7 may be rotated in the releasing direction and the wire gripper 1 is unexpectedly detached from the linear body 3.

In this regard, in the present embodiment, a predetermined operation is performed; accordingly, rotation of the link plate 7 in the releasing direction can be regulated by the regulating portion 13 such that the wire gripper 1 is not detached from the linear body 3. Specifically, the operation lever 55 of the regulating portion 13 is rotated from the first operation position P1 toward the regulation direction. Since operation at this time was explained in detail earlier, it will be briefly described herein.

Since the cam plate 43 and the operation lever 55 are initially coupled with each other by the ball plungers 93, the cam plate 43 is rotated around the second shaft part 62 of the eccentric shaft 53 along with rotation of the operation lever 55 (at the same time, a position of the second shaft part 62 accordingly moves along with rotation of the operation lever 55). The stopper member 73 slides by pressing of the cam portion 77 and eventually comes in contact with and press the edge 41 of the link plate 7. Accordingly, rotation of the link plate 7 in the releasing direction is regulated. The first claw 81 is engaged with the second claw 82, which keeps a position where the cam plate 43 is rotated relative to the stopper member 73.

When an operation position of the operation lever 55 reaches an appropriate position (for example, near the second operation position P2 in FIG. 5), the above-described pressing reaction force is stronger than holding force of the ball plungers 93, which releases a coupling state in which the operation lever 55 and the cam plate 43 are coupled with each other by the ball plungers 93. After that, the operation lever 55 rotates independently. Since the position of the second shaft part 62 continues to move along with rotation of the operation lever 55, the cam portion 77 of the cam plate 43 strongly presses the edge 41 of the link plate 7 with the stopper member 73. FIG. 5 illustrates, by a chain line, a position after the cam plate 43 is moved along with movement of the second shaft part 62. Such pressing by the cam portion 77 leads to a strong mechanical coupling between the first claw 81 and the second claw 82, which certainly prevents the cam plate 43 from unexpectedly rotating in the deregulation direction.

Figure 6:
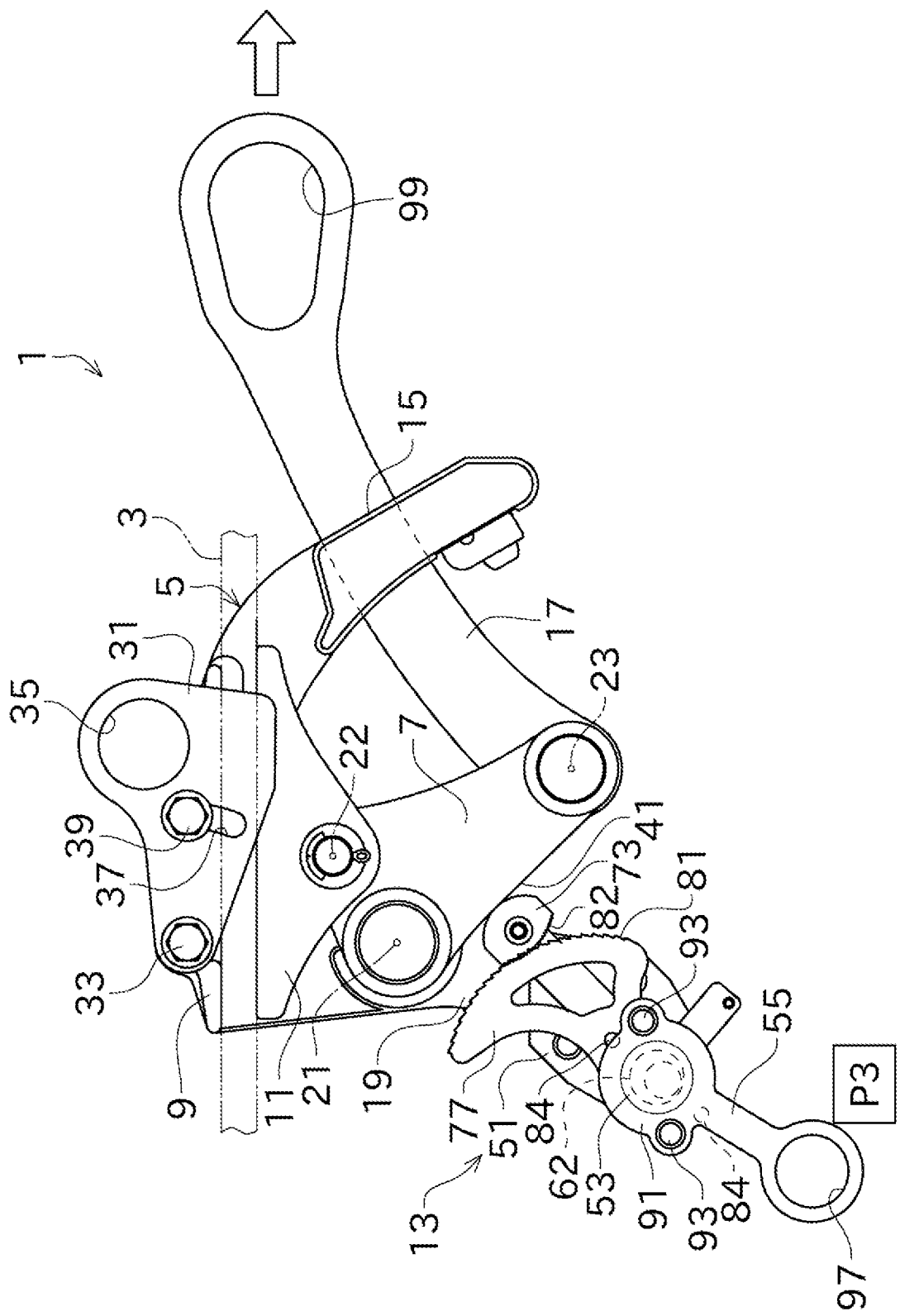
FIG. 6 is a drawing illustrating a state in which the operation lever further rotates from a state illustrated in FIG. 5 and the cam plate strongly presses the stopper member.

Rotation of the operation lever 55 is simply required to stop at a position where the operation lever 55 rotates independently and then further rotates by a sufficient angle in the regulation direction (for example, a third operation position P3 illustrated in FIG. 6). As above, the operations for regulation are completed. In this state, it is certain that the wire gripper 1 can continue to be tightly attached to the linear body 3.

A work in which the wire gripper 1 is detached from the linear body 3 is simply required for performing the above-described steps in reverse, so their description will be omitted. When the operation lever 55 is rotated from the third operation position P3 toward the deregulation direction, the cam plate 43 is coupled to the operation lever 55 with the ball plungers 93 near the second operation position P2 or the like. After that, the cam plate 43 is integrally rotated with the operation lever 55.

As such, in the present embodiment, it is possible to achieve, with one action, the first operation in which the stopper member 73 is pressed toward the edge 41 of the link plate 7 with a certain strength and the second operation in which the cam plate 43 and the stopper member 73 strongly press and lock the edge 41. This can achieve a simplified operation.

Figure 7:
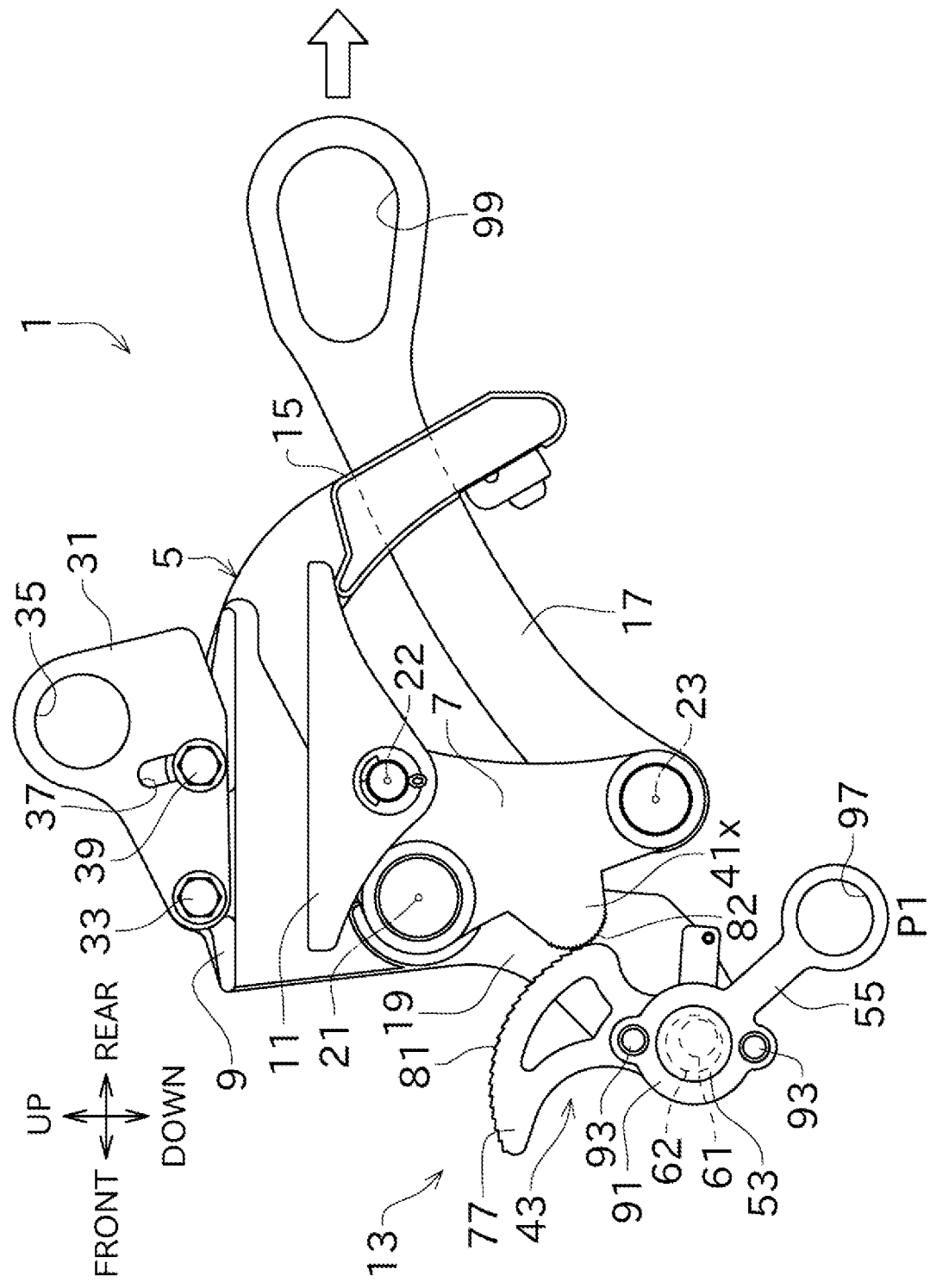
FIG. 7 is a drawing illustrating a modification of the first embodiment.

As illustrated in FIG. 7, a configuration of the wire gripper 1 may be modified such that a projection 41x having the same dimension as the stopper member 73 is formed in the link plate 7 and directly comes in contact with the cam portion 77. In this case, the cam plate 43 serves as a member for directly coming in contact with and pressing the link plate 7. The second claw 82 is formed in the projection 41x. The projection 41x substantially has a function as the edge 41 of the link plate 7.

As described above, the wire gripper 1 of the present embodiment includes the main body 5, the link plate 7, the stationary-side wire gripping portion 9, and the moveable-side wire gripping portion 11. The link plate 7 is rotatably supported by the main body 5. The stationary-side wire gripping portion 9 is provided in the main body 5. The moveable-side wire gripping portion 11 is provided in the link plate 7 so as to face the stationary-side wire gripping portion 9. The moveable-side wire gripping portion 11 is movable toward a direction approaching or spaced away from the stationary-side wire gripping portion 9 by rotation of the link plate 7. The stationary-side wire gripping portion 9 and the moveable-side wire gripping portion 11 hold and grip the linear body 3. The wire gripper 1 includes the cam plate 43 and the eccentric shaft 53. In response to operation of the operation lever 55, the cam plate 43 can indirectly (that is, with the stopper member 73) press the link plate 7 so as to regulate rotation of the link plate 7 toward a direction where the moveable-side wire gripping portion 11 is spaced away from the stationary-side wire gripping portion 9. The eccentric shaft 53 can indirectly further press the link plate 7 in response to operation of the operation lever 55 in a state in which the cam plate 43 indirectly presses the link plate 7 as described above. A stroke in which the stopper member 73 (that is, a member that directly comes in contact with and presses the link plate 7) additionally advances along with movement of the eccentric shaft 53 is smaller than a stroke in which the stopper member 73 advances along with rotation of the cam plate 43.

Accordingly, when the wire gripper 1 is attached to the linear body 3, rotation of the link plate 7 can be regulated with a simple operation by the regulating portion 13, such that the wire gripper 1 is not detached from the linear body 3. In addition, the cam plate 43 quickly presses the link plate 7; subsequently, the eccentric shaft 53 presses the link plate 7 with a short stroke (strongly). This can smoothly achieve the above-described regulation in a short time.

The wire gripper 1 of the present embodiment includes the operation lever 55 that can perform rotation operation. The eccentric shaft 53 functions as the eccentric cam. The cam plate 43 corresponds to a pressing cam that is rotatably supported by the eccentric shaft 53. The rotation operation of the operation lever 55 allows the cam plate 43 and the operation lever 55 to be integrally rotated with each other and to indirectly (that is, with the stopper member 73) press the link plate 7. The operation lever 55 is further operated to rotate, which allows the cam plate 43 that is moved by the eccentric shaft 53 being rotated to indirectly further press the link plate 7.

Accordingly, rotation regulation in which rotation of the link plate 7 is regulated by the cam plate 43 and the eccentric shaft 53 can be achieved with one action that allows the operation lever 55 to be rotated.

The wire gripper 1 of the present embodiment includes the ball plungers 93 that hold the operation lever 55 such that the operation lever 55 is not rotated relative to the cam plate 43. The ball plungers 93 release such holding when the pressing reaction force generated along with pressing in which the cam plate 43 indirectly (that is, with the stopper member 73) presses the link plate 7 is stronger than a predetermined strength.

Accordingly, it is possible to automatically switch pressing between pressing along with rotation of the cam plate 43 and additional pressing along with the eccentric shaft 53, with a simple configuration.

In the wire gripper 1 of the present embodiment, the cam plate 43 indirectly presses the link plate 7 with the stopper member 73. An engagement mechanism formed by the first claw 81 and the second claw 82 is provided between the stopper member 73 and the cam plate 43, the engagement mechanism mechanically coupling the stopper member 73 and the cam plate 43 with each other by using the pressing force of the cam plate 43.

Accordingly, the link plate 7 does not need to have a complicated shape as in FIG. 7; therefore, it is easy to apply the present invention to the wire gripper 1 having the known configuration. It is also possible to automatically lock the cam plate 43 without moving toward a direction releasing regulation along with pressing.

However, as illustrated in FIG. 7, the cam plate 43 may directly press the link plate 7. In this case, the engagement mechanism formed by the first claw 81 and the second claw 82 is provided between the link plate 7 and the cam plate 43, the engagement mechanism mechanically coupling the link plate 7 and the cam plate 43 by using pressing force of the cam plate 43.

In the above-described configuration, a simple configuration with a small number of components can be achieved. In this configuration, it is possible to automatically lock the cam plate 43 without moving toward the direction releasing the regulation along with pressing.

Figure 8:
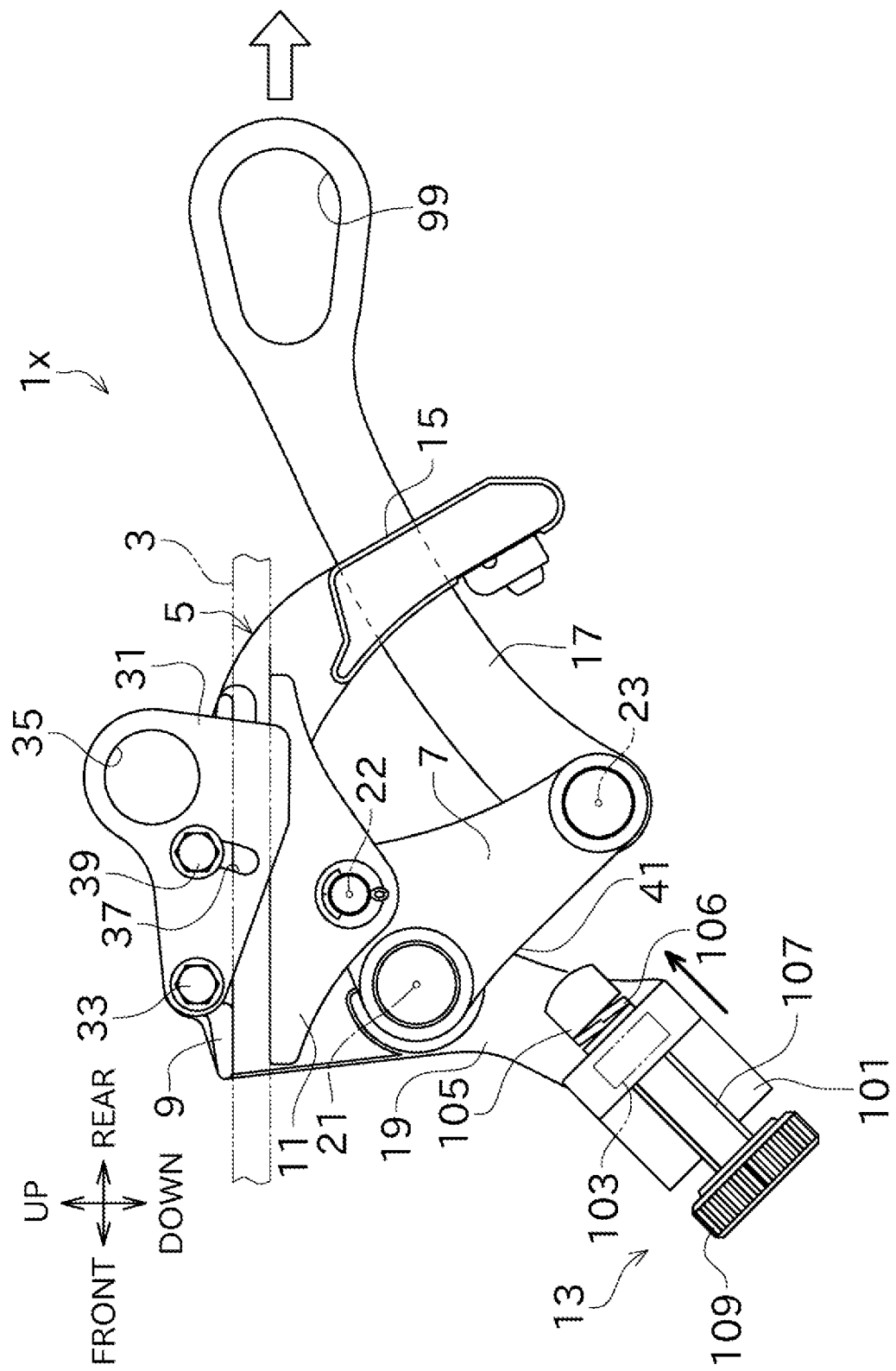
FIG. 8 is a drawing of a wire gripper according to a second embodiment of the present invention as viewed in a horizontal direction perpendicular to a linear body.
Figure 9:
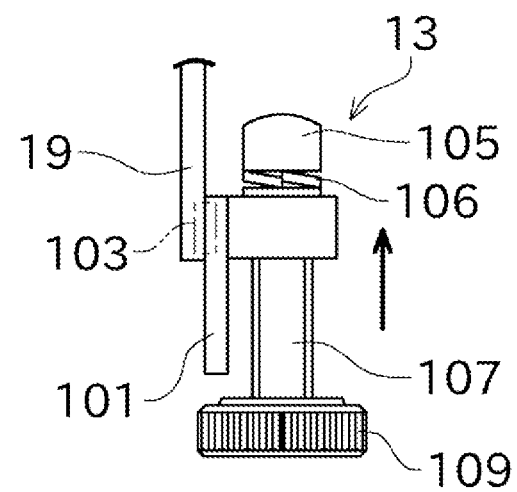
FIG. 9 is a partial enlarged view of FIG. 8.
Figure 10:
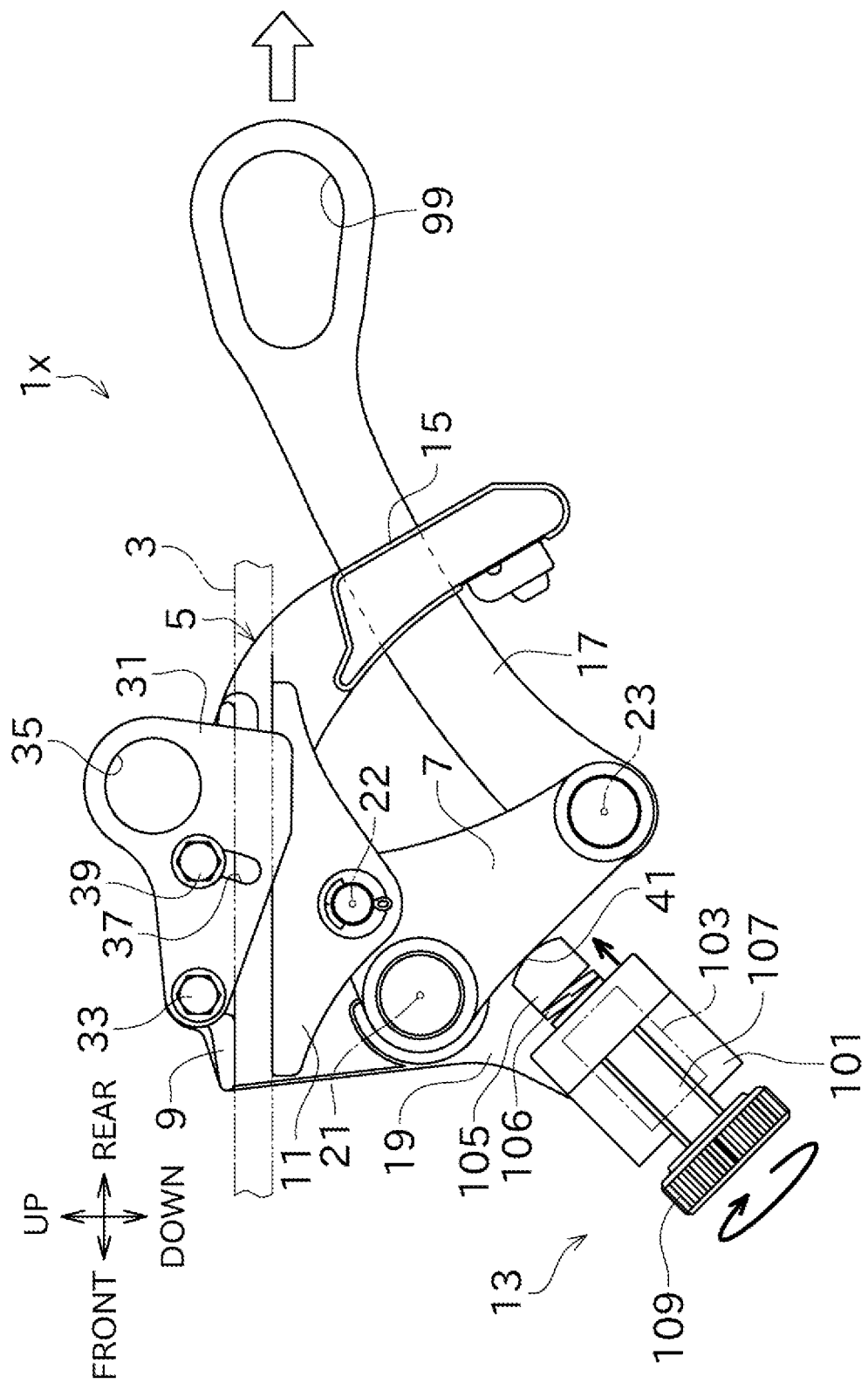
FIG. 10 is a left side view illustrating a state in which the wire gripper is regulated by a regulating portion.
Figure 11:
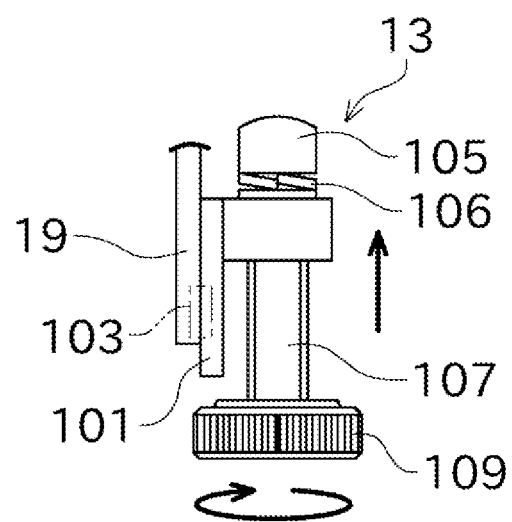
FIG. 11 is a partial enlarged front view of FIG. 10.

Next, a second embodiment of the present invention will be described with reference to FIG. 8 to FIG. 11. FIG. 8 is a drawing of a wire gripper 1x according to the second embodiment of the present invention as viewed in a horizontal direction perpendicular to the linear body 3. FIG. 9 is a partial enlarged view of FIG. 8. In the description of the present embodiment, members identical or similar to those of the above-described embodiment may not be described and instead the same reference signs as in the above-described embodiment are given on the drawings.

Regarding a configuration for regulating rotation of the link plate 7, the wire gripper 1x of the present embodiment is different from the wire gripper 1 of the first embodiment.

Specifically, in the wire gripper 1x of the present embodiment, the regulating portion 13 has a base member 101, a one-way clutch 103, a pressing piece (first pressing member) 105, a screw shaft (second pressing member) 107, and an operation picking handgrip 109.

The base member 101 is attached onto the supporting plate 19 via a known slide mechanism. The base member 101 is linearly movable relative to the main body 5, toward a substantially same direction as a sliding direction of the stopper member 73 of the first embodiment.

The base member 101 has the pressing piece (first pressing member) 105. The pressing piece 105 can directly come in contact with and press the edge 41 of the link plate 7. The pressing piece 105 is attached to a distal end of the screw shaft 107 screwed into the base member 101. An axial direction of the screw shaft 107 is in line with a sliding direction of the base member 101. A spring 106 is attached to the pressing piece 105. This can stabilize pressing in which the pressing piece 105 presses the link plate 7.

The operation picking handgrip 109 is fixed to an end portion of the screw shaft 107. Rotation operation of the operation picking handgrip 109 allows the pressing piece 105 to move in a screw-feeding manner.

The one-way clutch 103 is disposed in the known slide mechanism. The one-way clutch 103 allows movement of the pressing piece 105 toward a direction approaching the edge 41 of the link plate 7, and prevents movement of the pressing piece 105 toward a direction spaced away from the edge 41.

With such a configuration, in order to regulate the link plate 7, the base member 101 is firstly pressed from below thereby sliding and moving. Instead of the base member 101, the operation picking handgrip 109 may be pressed from below. This leads to a state in which the pressing piece 105 comes in contact with the edge 41 of the link plate 7 and is pressed with a weak force. Even when the pressing reaction force along with pressing in which the pressing piece 105 presses the link plate 7 is added to the pressing piece 105, the base member 101 does not return because of attachment of the one-way clutch 103 to the base member 101. In this state, rotation operation of the operation picking handgrip 109 allows the pressing piece 105 to move in a screw-feeding manner. As a result, the pressing piece 105 strongly presses the edge 41 of the link plate 7.

In the present embodiment, most of a stroke of movement of the pressing piece 105 for regulating rotation of the link plate 7 is achieved by slide movement of the base member 101. Therefore, the amount of rotation of the operation picking handgrip 109 can be significantly reduced and the work can be smoothly performed in a short time, as compared with a configuration in which the pressing piece 105 is moved in a screw-feeding manner for all of the strokes, for example.

The one-way clutch 103 can also allow the pressing piece 105 to move toward the direction spaced away from the edge 41 of the pressing piece 105, with a predetermined operation. When it is desired to allow the link plate 7 to rotate toward the releasing direction, the one-way clutch 103 is simply required to be set in the above-described state.

As described above, in the wire gripper (gripping tool) 1x of the present embodiment, the pressing piece 105 is disposed in the base member 101 that is linearly movable relative to the main body 5. The wire gripper 1x includes the one-way clutch 103. The one-way clutch 103 allows movement of the pressing piece 105 toward the direction approaching the link plate 7 and prevents movement toward the opposite direction.

Accordingly, linear movement of the base member 101 can quickly press the link plate 7 with the pressing piece 105.

Although preferred embodiments of the present invention have been described as above, the following modified embodiments are acceptable.

The number of ball plungers 93 is not limited to two. For example, one or three ball plungers 93 are acceptable.

A mark clearly indicating a rotation position of the operation lever 55 (or the eccentric shaft 53) may be put onto the eccentric shaft 53, for example.

The slide groove 87 may be formed onto the supporting plate 19 instead of the guide groove member 51. In this case, the guide groove member 51 may be omitted.

In the second embodiment, movement of the pressing piece 105 may be achieved by a combination of the one-way clutch 103 and a cam, instead of a combination of the one-way clutch 103 and the screw shaft 107, for example.

The stationary-side wire gripping portion 9 is not integrally formed with the main body 5, and may be a component separated from the main body 5.

The linear body 3 is not limited to an electric wire and a wire, and may be a member having a long length.

It is clear that the present invention may include multiple modified embodiments and variations in view of the above-described teachings. Therefore, it is noted that the present invention may be implemented by methods other than that described in claims of this specification.

DESCRIPTION OF THE REFERENCE NUMERALS 1, 1x wire gripper (gripping tool)
3 linear body
5 main body
7 link plate (link member)
9 stationary-side wire gripping portion (stationary-side gripping portion)
11 moveable-side wire gripping portion (moveable-side gripping portion)
43 cam plate (first pressing member, pressing cam)
53 eccentric shaft (second pressing member, eccentric cam)
55 operation lever (operating portion)
73 stopper member (intermediate member)
93 ball plunger (holding portion)
101 base member
103 one-way clutch
105 pressing piece (first pressing member)
107 screw shaft (second pressing member)
109 operation picking handgrip (operating portion)

The invention claimed is:
1. A gripping tool, comprising:
a main body;
a link member rotatably supported by the main body;
a stationary-side gripping portion provided in the main body;
a moveable-side gripping portion that faces the stationary-side gripping portion and that is provided in the link member, the moveable-side gripping portion being movable toward a direction approaching or spaced away from the stationary-side gripping portion along with rotation of the link member, the stationary-side gripping portion and the moveable-side gripping portion that grip and hold a linear body;
a first pressing member configured to indirectly press the link member, by rotation of the first pressing member depending on operation, to regulate rotation of the link member toward a direction where the moveable-side gripping portion is spaced away from the stationary-side gripping portion; and
a second pressing member configured to make the first pressing member indirectly press the link member depending on operation, in a state in which the first pressing member indirectly presses the link member,
wherein a stroke in which a member, directly coming in contact with and pressing the link member by being pressed by the first pressing member, additionally advances by movement of the second pressing member is smaller than a stroke in which the member advances by rotation of the first pressing member.

2. The gripping tool according to claim 1, wherein the first pressing member indirectly presses the link member with an intermediate member and wherein the gripping tool further comprising:
an engagement mechanism mechanically coupling the intermediate member and the first pressing member by utilizing pressing force of the first pressing member, the engagement mechanism being provided between the intermediate member and the first pressing member.

3. A gripping tool, comprising:
a main body;
a link member rotatably supported by the main body;
a stationary-side gripping portion provided in the main body;
a moveable-side gripping portion that faces the stationary-side gripping portion and that is provided in the link member, the moveable-side gripping portion being movable toward a direction approaching or spaced away from the stationary-side gripping portion along with rotation of the link member, the stationary-side gripping portion and the moveable-side gripping portion that grip and hold a linear body;
a first pressing member configured to directly press the link member, by rotation of the first pressing member depending on operation, to regulate rotation of the link member toward a direction where the moveable-side gripping portion is spaced away from the stationary-side gripping portion; and
a second pressing member configured to make the first pressing member directly press the link member depending on operation, in a state in which the first pressing member directly presses the link member,
wherein a stroke in which the first pressing member directly comes in contact with and presses the link member additionally advances by movement of the second pressing member is smaller than a stroke in which the first pressing member advances by rotation of the first pressing member.

4. The gripping tool according to claim 3, wherein the first pressing member directly presses the link member and wherein the gripping tool further comprising:
an engagement mechanism mechanically coupling the link member and the first pressing member by utilizing pressing force of the first pressing member, the engagement mechanism being provided between the link member and the first pressing member.

5. The gripping tool according to claim 3, further comprising:
an operating portion configured to be rotatably operated,
wherein the second pressing member is an eccentric cam,
wherein the first pressing member is a pressing cam that is rotatably supported by the eccentric cam,
wherein the pressing cam and the operating portion are integrally rotated with each other along with rotation operation of the operation portion and directly press the link member, and
wherein when the operation portion is further operated to rotate, the pressing cam that is moved by the eccentric cam being rotated directly further presses the link member.

6. The gripping tool according to claim 5, further comprising:
a holding portion holding the operating portion without rotation relative to the pressing cam, the holding portion releasing holding of the operating portion when pressing reaction force generated along with pressing in which the pressing cam directly presses the link member exceeds a predetermined strength.

7. A gripping tool, comprising:
a main body;
a link member rotatably supported by the main body;
a stationary-side gripping portion provided in the main body;
a moveable-side gripping portion that faces the stationary-side gripping portion and that is provided in the link member, the moveable-side gripping portion being movable toward a direction approaching or spaced away from the stationary-side gripping portion along with rotation of the link member, the stationary-side gripping portion and the moveable-side gripping portion that grip and hold a linear body;
a first pressing member configured to indirectly press the link member, by rotation of the first pressing member depending on operation, to regulate rotation of the link member toward a direction where the moveable-side gripping portion is spaced away from the stationary-side gripping portion;
a second pressing member configured to make the first pressing member indirectly press the link member depending on operation, in a state in which the first pressing member indirectly presses the link member; and
an operating portion configured to be rotatably operated,
wherein a stroke in which a member, directly coming in contact with and pressing the link member by being pressed by the first pressing member, additionally advances by movement of the second pressing member is smaller than a stroke in which the member advances by rotation of the first pressing member,
wherein the second pressing member is an eccentric cam,
wherein the first pressing member is a pressing cam that is rotatably supported by the eccentric cam,
wherein the pressing cam and the operating portion are integrally rotated with each other along with rotation operation of the operation portion and indirectly press the link member, and
wherein when the operation portion is further operated to rotate, the pressing cam that is moved by the eccentric cam being rotated indirectly further presses the link member.

8. The gripping tool according to claim 7, further comprising:
a holding portion holding the operating portion without rotation relative to the pressing cam, the holding portion releasing holding of the operating portion when pressing reaction force generated along with pressing in which the pressing cam indirectly presses the link member exceeds a predetermined strength.

* * * * *